Dec. 17, 1957 R. L. SCHAEFFER 2,816,685
ELECTRIC COOKING VESSEL SUPPORT
Filed April 10, 1957
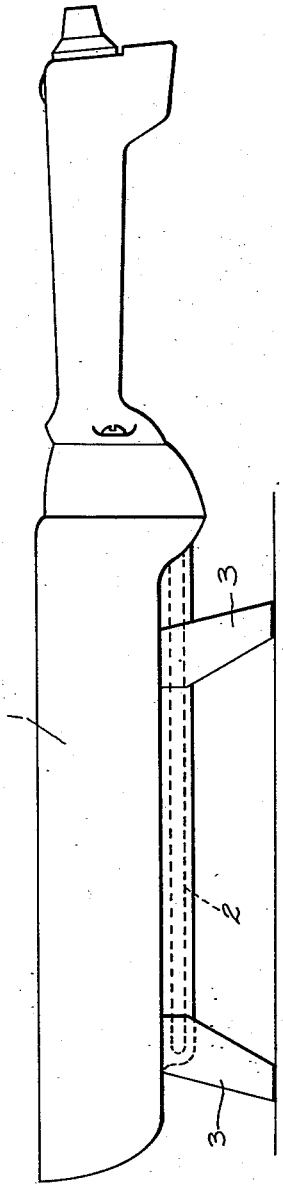
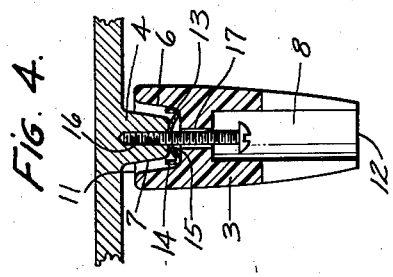
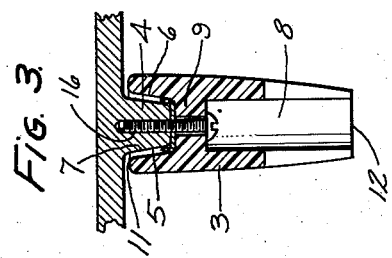
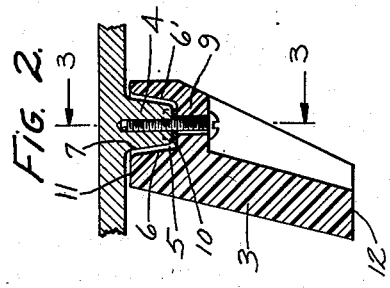
Inventor:
Robert L. Schaeffer
by Leonard J. Platt
His Attorney United States Patent Office 2,816,685
Patented Dec. 17, 1957

2,816,685

ELECTRIC COOKING VESSEL SUPPORT

Robert L. Schaeffer, Spencerport, N. Y., assignor to General Electric Company, a corporation of New York Application April 10, 1957, Serial No. 651,973

4 Claims. (Cl. 220—69)

This invention relates to electric cooking utensils, and more particularly to the supporting legs thereof.

Portable electric cooking vessels are generally provided with downwardly extending legs for supporting the vessel on a counter top or other supporting surface with the cooking vessel spaced from the supporting surface so that heat emanating from the vessel will not mar the supporting surface. It has been the practice to provide metallic cup-shaped slitted members between the cooking vessel and each of the legs thereof in order to reduce heat transfer from the vessel to the legs. This arrangement presents a problem with respect to cleaning the cup-shaped slitted members and providing a cooking vessel which has a simple, pleasing, ornamental appearance. A cooking vessel having simple, unfettered, rigid legs which may be easily cleaned and which adequately prevent the conduction of heat from the vessel to the surface upon which it rests is especially desirable.

Accordingly, it is a primary object of this invention to provide an improved rigid leg support for an electric cooking vessel which may be easily cleaned and which satisfactorily prevents the conduction of heat from the vessel to the surface upon which it rests.

It is another object of this invention to provide an improved leg arrangement for an electric cooking vessel which is simple in structure, capable of being manufactured at low cost and formed to provide a pleasing ornamental appearance.

In accordance with one aspect of this invention, a downwardly extending boss is formed on the bottom wall of the electric cooking vessel and an elongated heat resistant plastic leg is provided for supporting the vessel. An enlarged recess is formed in the upper portion of the plastic leg for receiving the boss, and a spring clip having opposed side arms and a bowed bottom portion is interposed between the bottom of the recess and the boss. Suitable securing means is fixed to the boss and extends through the leg and clip. The securing means urges the leg upward to straighten the bow in the bottom portion of the spring clip. As the bow is straightened, the arms of the clip move inwardly to grip the sides of the boss so as to positively hold the leg to the boss. By this arrangement, an effective plastic leg support for an electric cooking vessel which adequately prevents the conduction of heat from the vessel to the surface upon which it rests and which may be easily cleaned is provided.

Other objects and attendant advantages of this invention will be apparent from the following description taken in connection with the accompanying drawing in which:

Fig. 1 is a side elevational view of an electric skillet with the improved supporting legs secured thereon;

Fig. 2 is a detailed cross sectional view of the cooking vessel supporting leg arrangement;

Fig. 3 is a cross sectional view taken along the line 3—3 of Fig. 2; and

Fig. 4 is a detailed sectional view of the supporting leg arrangement partially assembled.

Referring now to Fig. 1 of the drawing, there is illustrated a cooking vessel 1 having a heating element 2 embedded in the lower portion thereof. The cooking vessel is provided with a plurality of improved supporting legs 3 whereby the bottom of the utensil is elevated above the counter top or other surface on which the utensil rests.

The improved leg support is achieved by forming a plurality of downwardly extending bosses 4 from the bottom wall of the electric cooking vessel. In this manner, the point of connection of supporting legs 3 with bosses 4 is spaced some distance from the heating element 2 so that a substantial quantity of heat from the heating element is dissipated before it reaches supporting legs 3. Legs 3 are formed of a heat resistant plastic which is capable of withstanding high temperatures. As shown in Fig. 2, an enlarged recess 5 is formed in the upper portion of the legs for receiving and substantially housing bosses 4. Recess 5 is formed sufficiently large with respect to boss 4 so that sides 6 thereof are spaced from sides 7 of boss 4. Thus, a dead air space is provided between boss 4 and the upper portion of leg 3. This dead air space acts as a thermal barrier and prevents conduction of heat from side surfaces 7 of the boss to surfaces 6 of the leg. As shown in Figs. 2 and 3, enlarged recess 5 may be frustro-pyramidal in shape for co-operation with a similarly shaped boss 4 so that leg 3 may be easily positioned on the boss and for preventing rotation of the leg with respect to the boss. If desired, recess 5 may partake of other shapes or may be three-sided, for example, with the unseen inside wall 6' removed.

The lower portion of plastic foot 3 is formed with an elongated groove 8 which co-operates with the bottom of recess 5 to provide a transverse wall 9. Further, the provision of groove 8 increases the surface area of leg 3 to permit more heat to be radiated from the leg. Referring to Figs. 2 and 3, it can be seen that the only heat conductive path between boss 4 and leg 3 is at the transverse wall 9 of leg 3 and the bottom surface 10 of boss 4, the top surface 11 of the leg and the side surfaces 6 of the recess being spaced from the bottom wall of the cooking vessel and the side surfaces of the boss, respectively. It can also be seen that leg 3 is elongated and tapers downwardly so that the mass thereof is located close to the cooking vessel and the narrow bottom portion 12 of leg 3 rests on the supporting surface. With this arrangement, the greater portion of the heat which may be conducted from the bottom of the boss to the plastic leg is adequately radiated from the upper portion of leg 3. Hence, the bottom portion 12 of leg 3 which rests on the supporting surface remains relatively cool.

An improved spring clip 13 is provided to prevent leg 3 from loosening as the plastic flows due to the heat conducted from the bottom of boss 4 to the transverse wall 9 of leg 3. As shown partially assembled in Fig. 4, spring clip 13 is positioned between the bottom surface of boss 4 and transverse wall 9 of plastic foot 3. Clip 13 is substantially U-shaped and is provided with upwardly extending side arms 14. Bottom portion 15 of clip 13 is bowed upwardly for a purpose to be more fully described hereinafter.

Shouldered screw means 16 is provided for connecting legs 3 to bosses 4. As shown in Fig. 4, screws 16 extend upwardly through apertures 17 and 18 which are formed in transverse wall 9 of foot 3, and through the bottom portion 15 of clip 13, respectively. Each of bosses 4 is threaded to receive the inner ends of screws 16. The shoulder on screw 16 abuts the bottom surface of transverse wall 9. As the screw is tightened, leg 3 is urged upwardly to straighten the bow in bottom portion 15 of spring clip 13, and the arms of the clip are moved inwardly to grip the sides of boss 4 so as to positively hold leg 3 to boss 4, as shown in Fig. 3. With this arrangement, as the plastic flows the spring clip bows slightly to exert sufficient pressure on the boss and leg 3 to positively hold the leg to the boss.

It can be seen readily that with this improved leg construction, a simple, unfettered ornamental appearance may be achieved since leg 3 extends from the supporting surface to within an air gap of the bottom surface of the cooking vessel without interruption. It should also be apparent that with such a smooth unbroken leg, the leg may be easily cleaned so that it always presents a pleasing appearance.

While there has been shown and described a particular embodiment of this invention, it will be obvious to those skilled in the art that various changes and modifications can be made therein without departing from the invention, and therefore, it is aimed by the appended claims to cover all such changes and modifications as fall within the true spirit and scope of the invention.

What I claim as new and desire to secure by Letters Patent of the United States is:

1. An electric cooking vessel having a bottom wall comprising: a boss having sides extending downwardly from said bottom wall; a heat resistant plastic leg; a recess having a bottom formed in the upper part of said plastic leg for receiving said boss; a spring clip having opposed side arms and a normally bowed bottom portion interposed between said boss and the bottom of said recess; and securing means extending through the leg and clip and being fixed to the boss, said securing means urging said leg upward to straighten the bow in the spring clip and to cause the arms of the clip to engage the sides of said boss.

2. An electric cooking vessel having a bottom wall comprising: a boss having sides extending downwardly from said bottom wall; a heat resistant plastic leg; an elongated groove formed in said leg; a recess having a bottom formed in the upper part of said plastic leg for receiving said boss; a spring clip having opposed side arms and a normally bowed bottom portion interposed between said boss and the bottom of said recess; and securing means extending through the leg and clip and being fixed to the boss, said securing means urging said leg upward to straighten the bow in the spring clip and to cause the arms of the clip to engage the sides of said boss.

3. An electric cooking vessel having a bottom wall comprising: a plurality of bosses having sides extending downwardly from said bottom wall; a plurality of heat resistant plastic legs; an enlarged recess having a bottom formed in the upper part of each of said plastic legs for receiving one of said bosses; a U-shaped spring clip having opposed side arms and a normally bowed bottom portion interposed between each of said bosses and the bottom of each of said recesses; and securing means extending through each of said legs and clips and being fixed to the bosses, said securing means urging said plastic legs upward to straighten the bow in each of the spring clips and to cause the arms of the clips to engage the sides of said bosses.

4. An electric cooking vessel having a bottom wall comprising: a plurality of generally frustopyramidal shaped bosses having sides extending downwardly from said bottom wall; a plurality of heat-resistant plastic legs having a top portion; an enlarged generally frustopyramidal shaped recess having sides and a bottom formed in the upper part of each of said plastic legs for receiving and substantially housing one of said bosses; a U-shaped spring clip having opposed side arms and a bowed bottom portion interposed between each of said bosses and the bottom of each of said recesses; a screw extending through each of said legs and clips and being threaded into said bosses, said screw being tightened to cause said legs to be urged upwardly to straighten the bows in the clips so that the side arms of the clips grip the sides of said bosses, the top portion of said legs being spaced from the bottom wall of said cooking vessel, and the side walls of said recesses being spaced from the sides of said frustopyramidal bosses.

References Cited in the file of this patent
UNITED STATES PATENTS

| 2,744,995 | Jepson | May 8, 1956 |

FOREIGN PATENTS

| 1,385 | Great Britain | 1861 |
| 207,973 | Switzerland | Apr. 1, 1940 |